(12) United States Patent
Suzuki

(10) Patent No.: US 12,084,209 B2
(45) Date of Patent: Sep. 10, 2024

(54) ROTORCRAFT

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 353 days.

(21) Appl. No.: 16/754,635

(22) PCT Filed: Oct. 10, 2017

(86) PCT No.: PCT/JP2017/036674
§ 371 (c)(1),
(2) Date: Apr. 8, 2020

(87) PCT Pub. No.: WO2019/073521
PCT Pub. Date: Apr. 18, 2019

(65) Prior Publication Data
US 2020/0354047 A1    Nov. 12, 2020

(51) Int. Cl.
| | | |
|---|---|---|
| *B64U 10/14* | (2023.01) |
| *B64C 39/02* | (2023.01) |
| *B64U 10/13* | (2023.01) |
| *B64U 10/16* | (2023.01) |
| *B64U 30/20* | (2023.01) |
| *B64U 50/19* | (2023.01) |

(52) U.S. Cl.
CPC ............ *B64U 10/13* (2023.01); *B64C 39/024* (2013.01); *B64U 10/14* (2023.01); *B64U 10/16* (2023.01); *B64U 30/20* (2023.01); *B64U 50/19* (2023.01)

(58) Field of Classification Search
CPC ............ B64C 27/08; B64C 2201/027; B64C 2201/042; B64C 2201/108; B64U 10/13; B64U 10/14; B64U 10/16
See application file for complete search history.

(56) References Cited

U.S. PATENT DOCUMENTS

| | | | | |
|---|---|---|---|---|
| 9,469,394 | B2 * | 10/2016 | Vaughn | ................. B64C 39/024 |
| 9,501,061 | B2 * | 11/2016 | Canoy | ................. G05D 1/0011 |
| 9,561,849 | B2 * | 2/2017 | Welsh | ................. B63H 25/00 |
| 10,822,082 | B2 * | 11/2020 | Hanna | ................. B64U 30/20 |

(Continued)

FOREIGN PATENT DOCUMENTS

| | | |
|---|---|---|
| CN | 205076036 U | 3/2016 |
| CN | 107176298 A | 9/2017 |

(Continued)

OTHER PUBLICATIONS

Translation of CN 205076036 U from FIT database (Year: 2016).*

(Continued)

*Primary Examiner* — Christopher R Legendre

(57) ABSTRACT

To provide a rotorcraft capable of improving flight efficiency. The rotorcraft according to the present invention is capable of moving forward along at least a first direction and comprises an arm part, a plurality of motors mounted on the arm part, and a rotary blade mounted on each of the motors. The rotorcraft is configured to have one or more motors one or more front motors located at a front side and one or more rear motors located at a rear side, wherein the output characteristics of a motor included in the front motor and the output characteristics of a motor included in the rear motor are different.

3 Claims, 7 Drawing Sheets

(56) References Cited

U.S. PATENT DOCUMENTS

| | | | |
|---|---|---|---|
| 2016/0059958 A1* | 3/2016 | Kvitnevskiy | B64C 27/08 |
| | | | 244/17.23 |
| 2017/0015418 A1 | 1/2017 | Matus | |
| 2017/0274982 A1* | 9/2017 | Beckman | B64C 11/28 |
| 2018/0281949 A1* | 10/2018 | Mitchell | B64C 27/32 |
| 2020/0354047 A1* | 11/2020 | Suzuki | B64C 39/024 |
| 2021/0188426 A1* | 6/2021 | Li | B64C 39/024 |
| 2023/0049474 A1* | 2/2023 | Suzuki | B64U 10/13 |

FOREIGN PATENT DOCUMENTS

| | | |
|---|---|---|
| DE | 20206936 U1 | 8/2002 |
| JP | 2007050841 A | 3/2007 |
| JP | 2017015697 A | 1/2017 |
| JP | 2017193321 A | 10/2017 |
| JP | WO2018066043 | 4/2018 |

OTHER PUBLICATIONS

Machine translation of CN 107176298 A (Year: 2017).*
Notice of Reasons for Refusal dated Sep. 16, 2021 for related JP Patent Application No. 2018-130505.
International Search Report for international Application No. PCT/JP2017/036674 dated Dec. 12, 2017.
Second Examination Opinion Notification dated Mar. 11, 2023 for Chinese Patent Application No. 201780092929.3.
Third Examination Opinion Notification dated Aug. 15, 2023 for Chinese Patent Application No. 201780092929.3.

* cited by examiner

ROTORCRAFT

CROSS-REFERENCE TO RELATED APPLICATIONS

The present application is a National Stage of International Application No. PCT/JP2017/036674, filed on Oct. 10, 2017, the disclosure of which is incorporated herein by reference in its entirety.

TECHNICAL FIELD

The present disclosure relates to a rotorcraft.

BACKGROUND ART

In recent years, various services have been provided using a rotorcraft such as a drone or an unmanned aerial vehicle (UAV) (hereinafter simply referred to as "rotorcraft") used for various purposes (for example, refer to Patent Document 1).

PRIOR ART

Patent Document 1: Japanese Unexamined Patent Application Publication No. 2017-15697

DESCRIPTION OF THE INVENTION

Technical Problem

The present disclosure is directed to provide a rotorcraft having a new structure capable of improving flight efficiency.

And so, the present disclosure is directed to provide a rotorcraft that can improve flight efficiency.

Technical Solution

According to the present disclosure,
a rotorcraft capable of moving forward along at least a first direction is provided, the rotorcraft comprising:
an arm part;
a plurality of motors mounted on the arm part,
wherein the plurality of motors, when viewed along at least the first direction, is configured to have one or more front motors located at a front side and one or more rear motors located at a rear side, and
wherein the output characteristics of the motor included in the front motor and the output characteristics of the motor included in the rear motor are different; and
a rotary blade mounted on each of the motors.

Advantageous Effects

According to the present disclosure, it is possible to provide a rotorcraft that can improve flight efficiency.

DETAILED DESCRIPTION OF THE INVENTION

Contents of embodiments of the present disclosure will be listed and described. A rotorcraft according to an embodiment of the present disclosure has the following configuration Item 1
A rotorcraft capable of moving forward along at least a first direction, comprising:
an arm part;
a plurality of motors mounted on the arm part,
wherein the plurality of motors, when viewed along at least the first direction, is configured to have one or more front motors located at a front side and one or more rear motors located at a rear side, and
wherein the output characteristics of the motor included in the front motor and the output characteristics of the motor included in the rear motor are different; and
a rotary blade mounted on each of the motors.
Item 2
The rotorcraft as set forth in Item 1,
further comprising a mounting part provided below the center of thrust by the rotor blades,
wherein the output characteristics of the motor included in the rear motor is higher than the output characteristics of the motor included in the front motor.
Item 3
The rotorcraft as set forth in Item 1,
further comprising a mounting part provided above the center of thrust by the rotor blades,
wherein the output characteristics of the motor included in the rear motor is smaller than the output characteristics of the motor included in the front motor.
Item 4
The rotorcraft as set forth in any one of Items 1 to 3,
wherein the rotorcraft is provided with two front motors and two rear motors.
Item 5
The rotorcraft as set forth in Item 1,
wherein at least either the front motor or the rear motor further comprises a plurality of grouped motors,
wherein the output characteristics are different between the groups.

Details of the Embodiment

Hereinafter, a rotorcraft according to an embodiment of the present disclosure will be described with reference to the accompanying drawings.

Detailed Description of an Embodiment of the Present Disclosure

Figure 1:
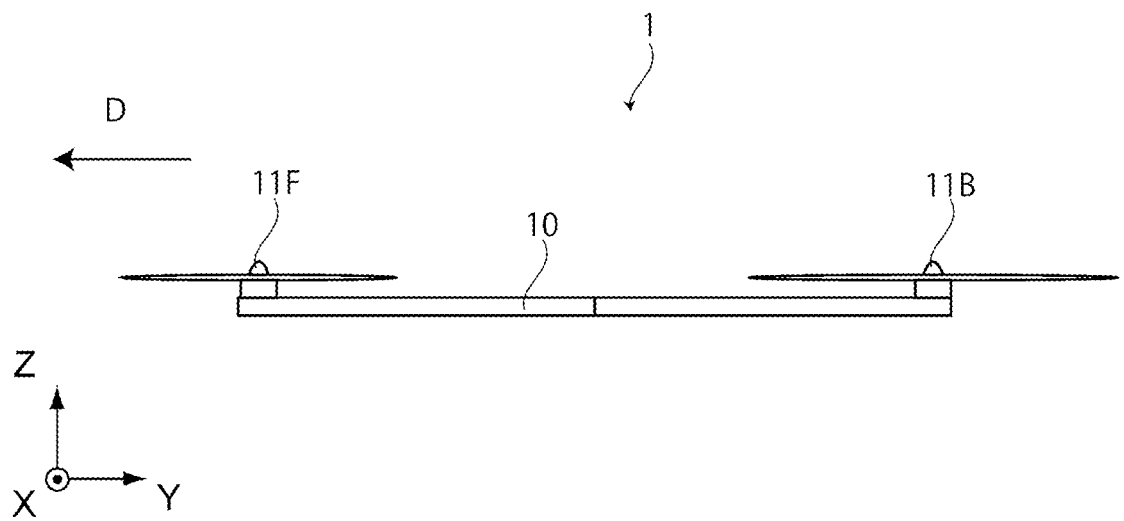
FIG. 1 is a side view of a rotorcraft according to the present disclosure.
Figure 2:
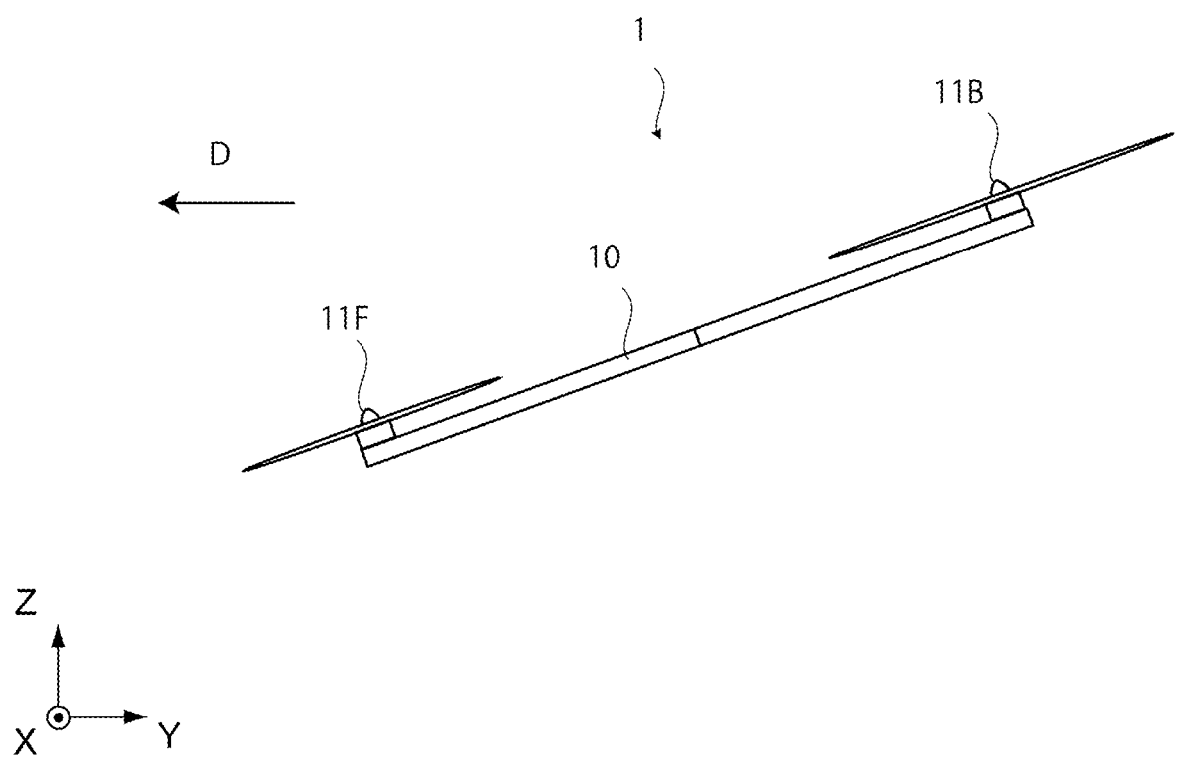
FIG. 2 is another side view of the rotorcraft of FIG. 1.

As shown in FIG. 2, the rotorcraft 1 according to an embodiment of the present disclosure is provided with propellers 11F and 11B (lift generating part: rotor blades), motors for rotating the propellers 11F and 11B, and an arm 10 on which the motors are mounted.

Further, the rotorcraft 1 shown is illustrated in a simplified manner in order to facilitate the description of the structure of the present disclosure. For example, a detailed configuration of a control unit or the like is not shown.

The rotorcraft 1 has the direction of arrow D (—YX direction) in the figures as the traveling direction (details will be described later).

In the following description, terms may be used according to the following definitions.

Front-rear direction: +Y direction and −Y direction
Up-down direction (or vertical direction): +Z direction and Z direction
Left-right direction (or horizontal direction): +X direction and −X direction
Traveling direction (forward): −Y direction
Reverse direction (backward): +Y direction
Ascending direction (upward): +Z direction
Descending direction (downward): +Z direction The propellers 11F and 11B receive the output from the motors to rotate. As the propellers 11F and 11B rotate, a propulsive force is generated for taking off the rotorcraft 1 from a starting point, horizontally moving it, and landing it at a destination. Further, the propellers 11F and 11B can rotate rightward, stop, and rotate leftward.

The propellers 11F and 11B of the present disclosure may have any number of blades (rotors)(e.g., . . . , 1, 2, 3, 4, or more blades). Further, the relationship between the propeller 11F and the propeller 11B will be described below. The shape of the blades can be any shape such as a flat shape, a bent shape, a twisted shape, a tapered shape, or a combination thereof.

In addition, the shape of the blades can be transformed (for example, size-adjustable, foldable, bendable, etc.). The blades can be symmetrical (having the same upper and lower surfaces) or asymmetric (having differently shaped upper and lower surfaces).

The blades can be formed to be airfoilsm wings or to have a geometrical form preferable for generating dynamic aerodynamic forces (e.g., lift, thrust) when moving through the air. The geometrical form of a blade can be selected as appropriate to optimize the dynamic air characteristics of the blade, such as increasing lift and thrust and reducing drag.

The motors cause the propellers 11F and 11B to rotate. For example, a drive unit may include an electric motor or an engine. The blade can be driven by the motor and rotate around axis of rotation of the motor (e.g., the long axis of the motor) in a clockwise and/or counterclockwise direction.

All the blades can rotate in the same direction, or it is also possible to rotate independently. Some of the blades rotate in one direction and the other blades rotate in the other direction. All of the blades can be rotated at the same rotational speeds, and can also be rotated at different rotational speeds. The numbers of rotations can be determined automatically or manually based on the dimensions (for example, size, weight) and the control state (speed, moving direction, etc.) of the moving body.

An arm 10 is a member that supports corresponding motors and propellers 11F and 11B, respectively. The arm 10 may be provided with a color displaying body such as an LED to indicate the flight state, flight direction, etc. of the rotorcraft. The arm 10 according to the present embodiment can be formed of a material appropriately selected from carbon, stainless steel, aluminum, magnesium, etc. or alloys or combinations thereof.

As shown in FIGS. 1 to 4, the rotorcraft I is a rotorcraft capable of moving forward along at least a traveling direction D (first direction). In the present embodiment, the rotorcraft 1 has two front motors and propellers 10F and two rear motors and propellers 10B.

Figure 3:
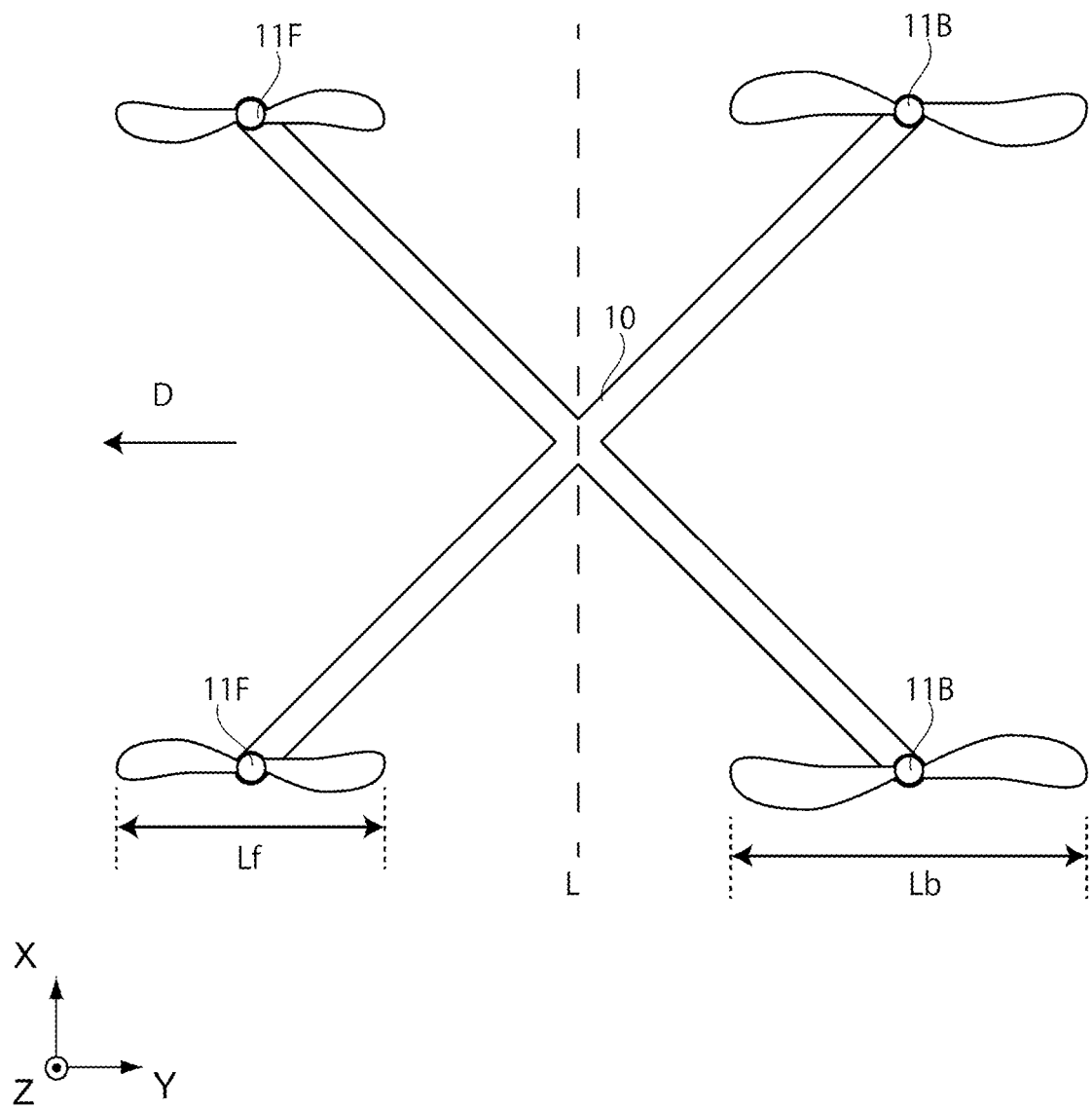
FIG. 3 is a view of the rotorcraft of FIG. 1 as viewed from above.
Figure 4:
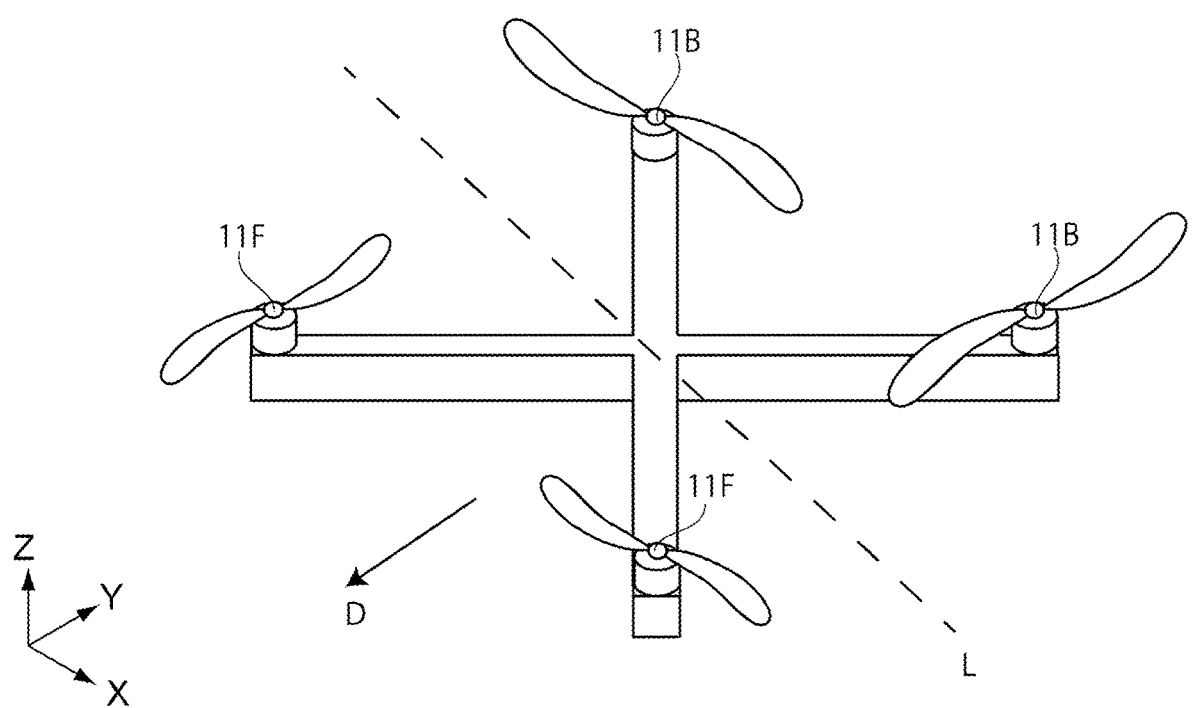
FIG. 4 is a perspective view of the rotorcraft of FIG. 1.

In particular, as shown in FIG. 3, when viewed along the traveling direction D (that is, when comparing the area before and the area after the virtual boundary L), the dia (propeller rotation diameter) Lf of the propeller 11F located at the front side is smaller than the dia (propeller rotation diameter) Lb of the propeller 11B located at the rear side.

That is, the output characteristics of the motor included in the front motor 10F of the rotorcraft according to the present embodiment are different from the output characteristics of the motor included in the rear motor 10B.

Figure 5:
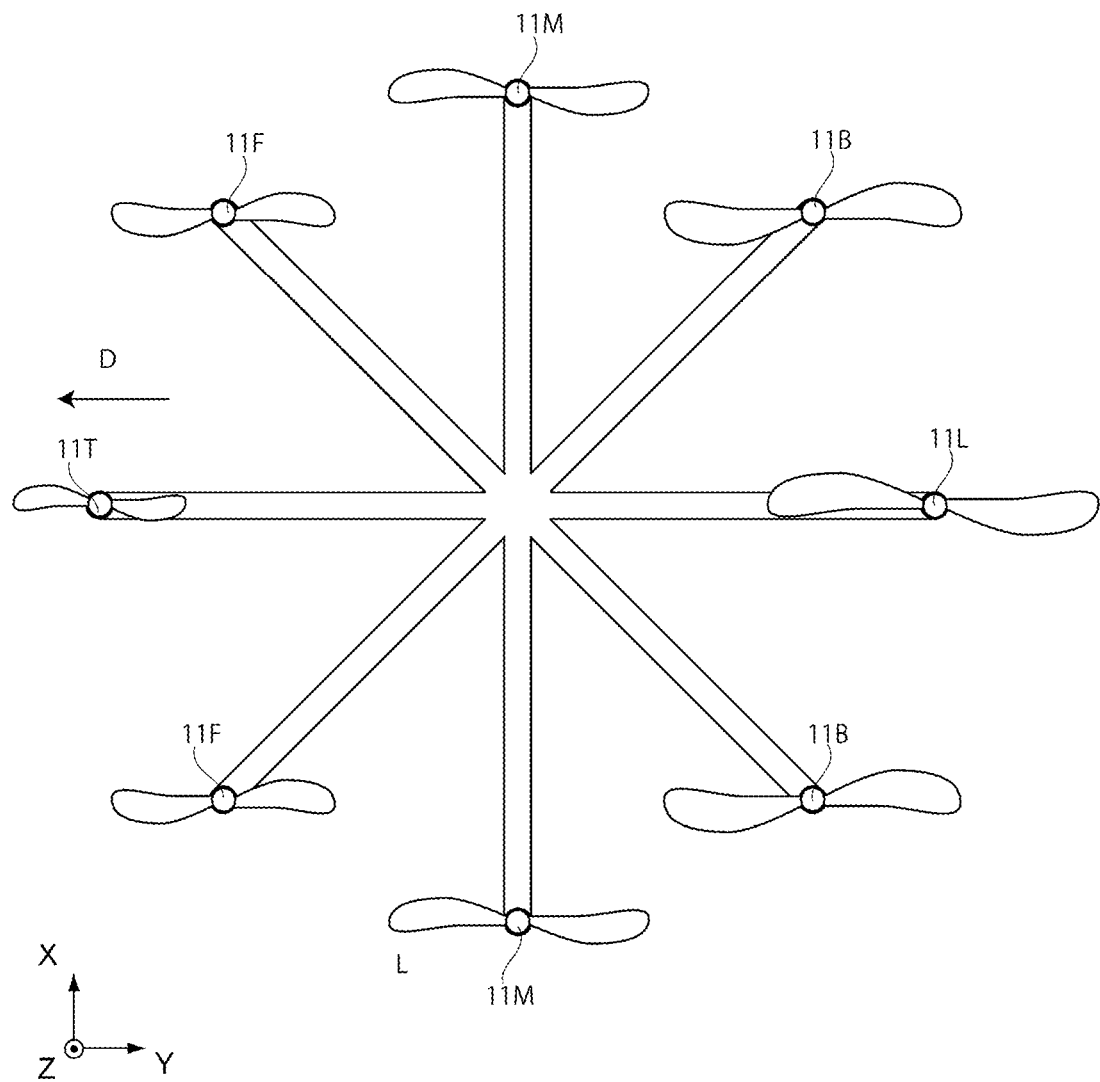
FIG. 5 is another rotorcraft according to the present disclosure.

In addition, as shown in FIG. 5, when viewed along the traveling direction D, the propeller 11T located at the frontmost, the propellers 11F, the propellers 11M, propellers 11B and the propeller 11L located at the rearmost, may have respective diameters that are larger subsequently in this order. In other words, the illustrated motors and propellers are configured to have a plurality of groups with grouped propellers having diameters of the same size from the front subsequently.

Figure 6:
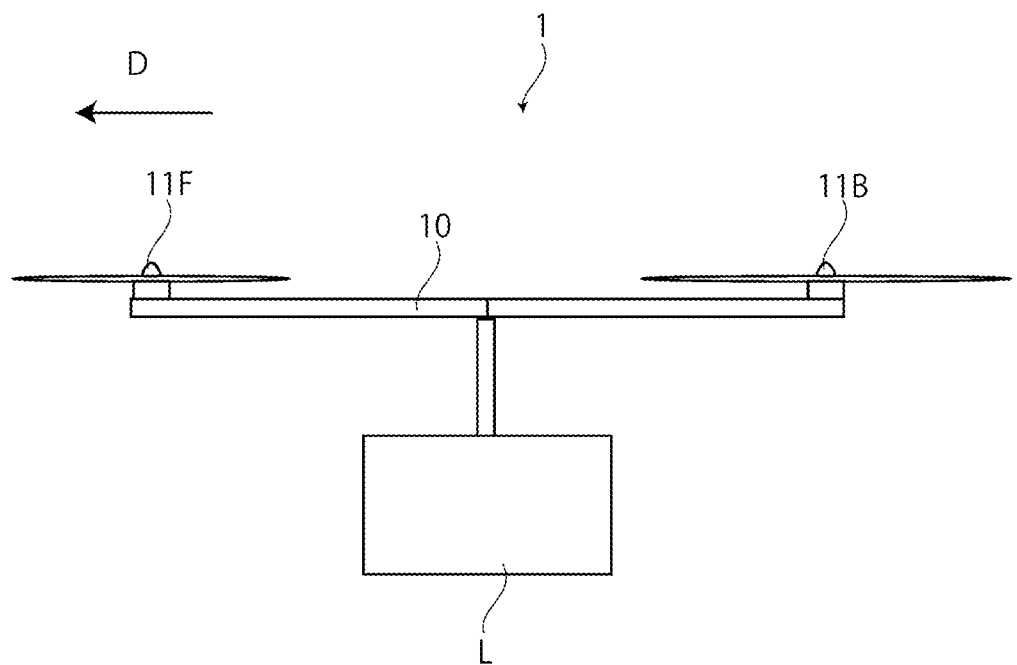
FIG. 6 is a view illustrating an example of the use of the rotorcraft of FIG. 1.
Figure 7:
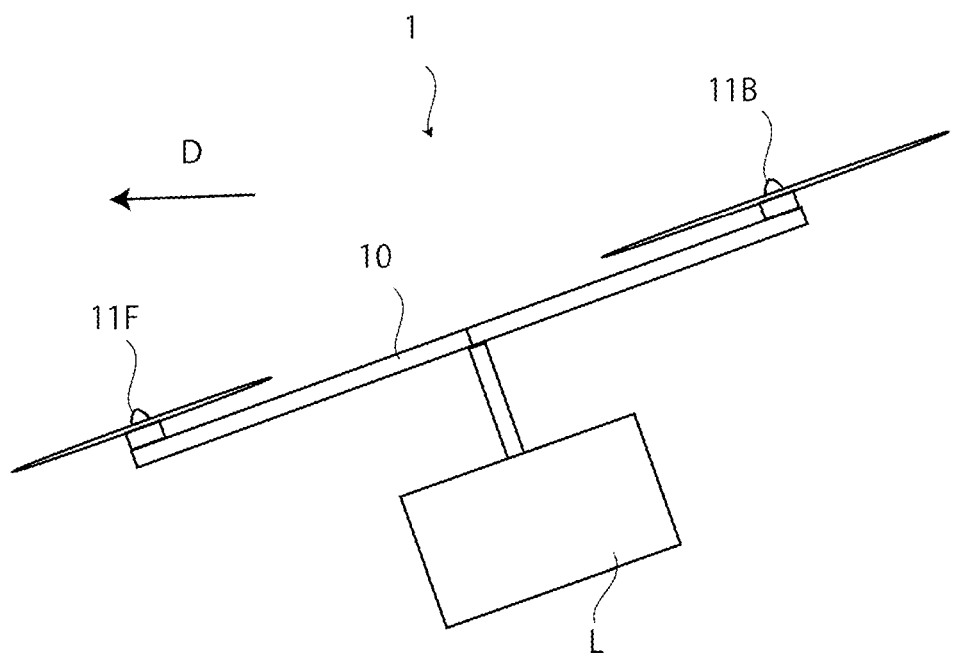
FIG. 7 is another view illustrating an example of the use of the rotorcraft of FIG. 1.

Next, the actual flight state will be described with reference to FIGS. 6 to 9. As shown in FIGS. 6 and 7, a mounting part is provided below the arm 10, and a load (such as a luggage) L is mounted thereon. At this time, the center of gravity of the entire rotorcraft is located below the center of thrust (lift) (the center of the thrust force) generated by the propeller 11F and propeller 11B.

As shown in FIG. 7, when the rotorcraft I moves forward, the center of gravity shifts backward from the hovering state shown in FIG. 6 due to the inclination of the airframe. At this time, the force (load) applied to the rear motor/propeller 11B is larger than the force (load) applied to the front motor/propeller 11F.

However, in the present embodiment, the thrust generated by the rear propeller 11B can be increased with the same output by reducing the size of the front propeller 11F and increasing the size of the rear propeller 11B.

Figure 8:
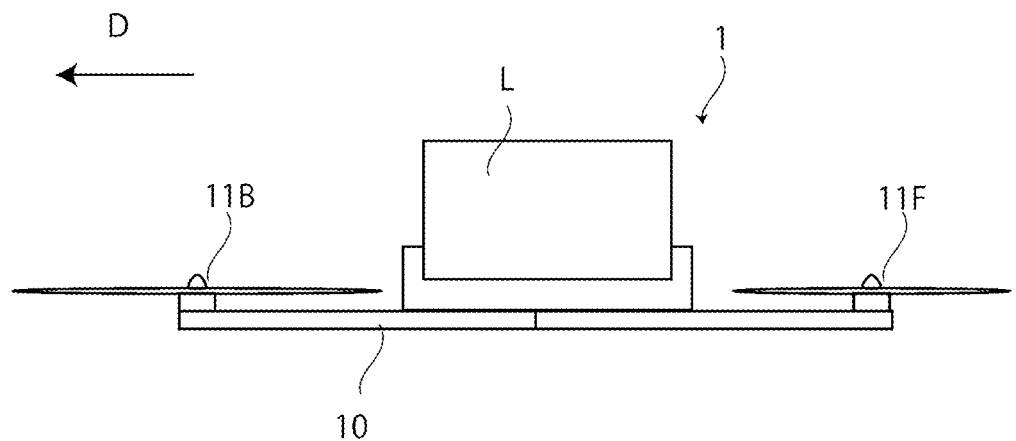
FIG. 8 is another view illustrating an example of the use of the rotorcraft of FIG. 1.
Figure 9:
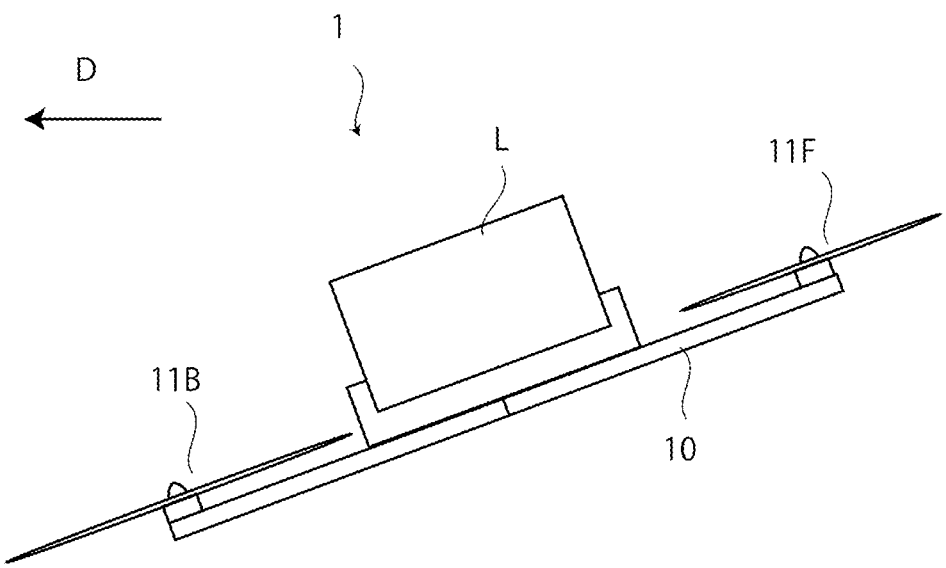
FIG. 9 is another view illustrating an example of the use of the rotorcraft of FIG. 1.

On the other hand, in the rotorcraft shown in FIGS. 8 and 9, the arrangement of the propellers is reversed compared to the rotorcraft shown in FIGS. 6 and 7. A mounting part is provided above the arm 10, and a load (such as a luggage) L is mounted thereon. At this time, the center of gravity of the entire rotorcraft is located above the center of thrust (lift) (the center of the thrust force) generated by the propeller 11F and propeller 11B.

As shown in FIG. 9, when the rotorcraft 1 moves forward, the center of gravity shifts forward from the hovering state shown in FIG. 8 due to the inclination of the airframe. At this time, the force (load) applied to the front motor/propeller 11B is larger than the force (load) applied to the rear motor/propeller 11F.

However, in the present embodiment, the thrust generated by the front propeller 11B can be increased with the same output by using the large propeller 11B at the front side and the small propeller 11F at the rear side.

The adjustment of the thrust may be performed by changing the propeller diameter while using the same motor, or by distinguishing between a low output motor and a high output motor while using the same propeller. Further, as examples, the pitch of the propeller may be changed, and the number of blades may be changed.

Figure 10:
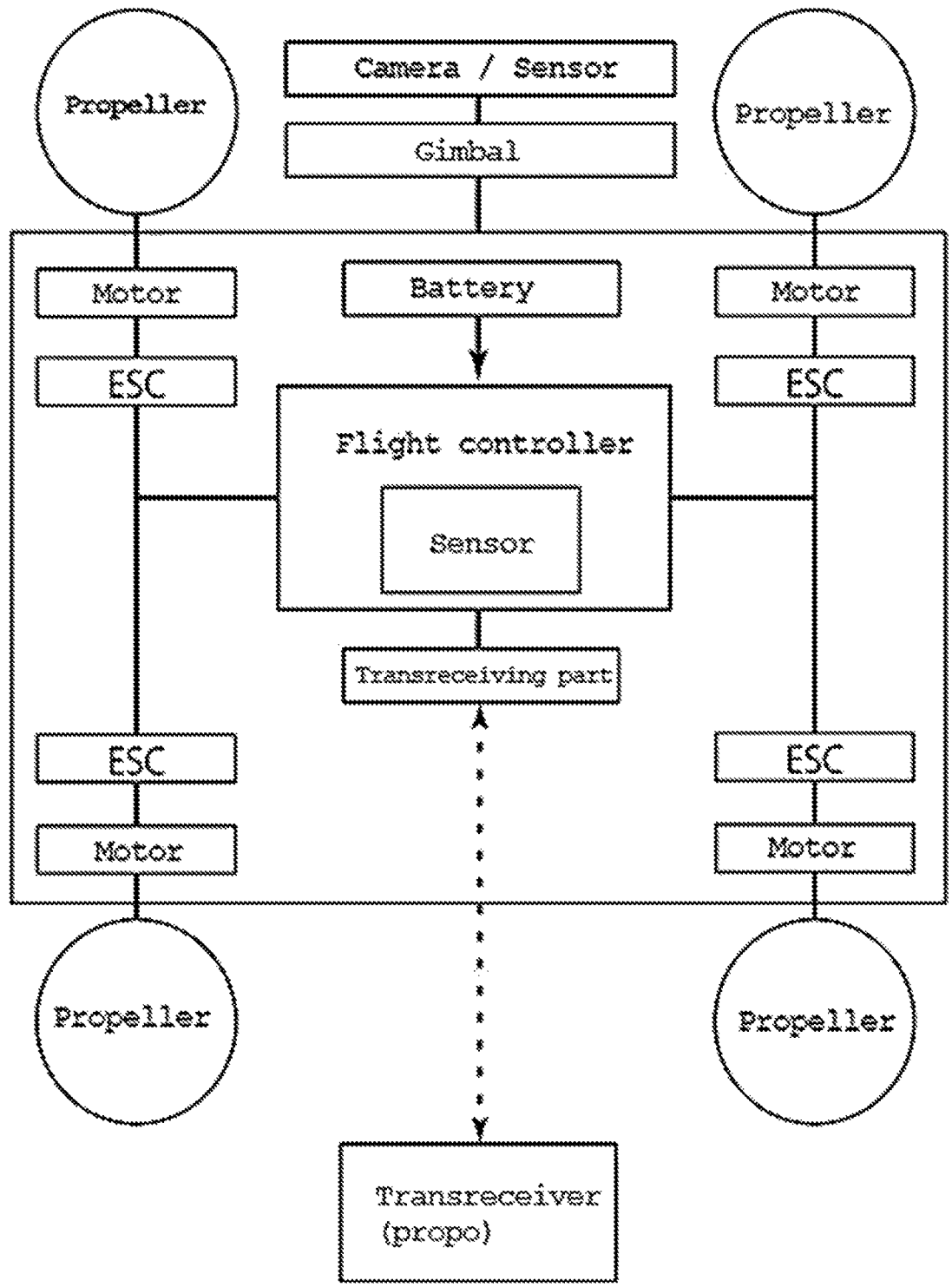
FIG. 10 is a functional block diagram of the rotorcraft of FIG. 1.

The above-described rotorcraft has, for example, a functional block as shown in FIG. 10. In addition, the functional block of FIG. 10 is a minimum reference structure. A flight controller is a so-called processing unit. The processing unit may have one or more processors, such as a programmable processor (e.g., a central processing unit (CPU)). The processing unit has a memory (not shown) and it is possible to access the memory. The memory stores logic, codes, and/or program instructions that can be executed by the processing unit to perform one or more steps. The memory may include, for example, a separable medium such as an SD card or random access memory (RAM) or an external storage device. Data obtained from cameras and sensors may be transmitted directly to the memory and stored. For example, still image·dynamic image data taken by a camera or the like is recorded in a built-in memory or an external memory.

The processing unit includes a control module configured to control the state of the rotorcraft. For example, the control module may control a propulsion mechanism (motor and the like) in order to adjust the spatial arrangement, velocity, and/or acceleration of the rotorcraft having six degrees of freedom (translational motions x, y, and z, and rotational motions θx, θy, and θz). Thee control module can control one or more of the states of a mounting part and sensors.

The processing unit can communicate with a transreceiving part configured to send and/or receive data from one or more external devices (e.g., a terminal, display device, or other remote controller). The transreceiver can use any suitable communication means such as wired or wireless communication. For example, the tranresceiving part can use one or more of a local area network (LAN), a wide area network (WAN), infrared, wireless, WiFi, point-to-point (P2P) network, telecommunication network, cloud communication, and the like. The transreceiving part can transmit and/or receive one or more of, data acquired by sensors, process results generated by the processing unit, predetermined control data, user command from a terminal or a remote controller, and the like.

Sensors according to the present embodiment may include inertial sensors (acceleration sensors, gyro sensors), GPS sensors, proximity sensors (eg., LiDAR), or vision/image sensors (e.g., cameras).

The rotorcraft of the present disclosure can be expected to be used as a rotorcraft for delivery services, and to be used as an industrial rotorcraft in a warehouse or a factory. In addition, the rotorcraft of the present disclosure can be used in airplane-related industries such as muiticopters and drones. Furthermore, the present disclosure can be used in various industries such as security, agriculture, and infrastructure monitoring, wherein the present invention can be suitably used as an aerial photography aircraft equipped with a camera or the like.

The above-described embodiments are merely examples for facilitating the understanding of the present invention and are not intended to limit the present invention. The present invention can be modified and improved without departing from the gist thereof, and it goes without saying that the equivalents are included in the present disclosure.

DESCRIPTION OF REFERENCE NUMERALS 1 rotorcraft
10 arm
11F, 11B propeller

The invention claimed is:

1. A rotorcraft capable of moving forward along a first direction, comprising:
   an arm part;
   a plurality of motors mounted on the arm part, wherein the plurality of motors, when viewed along the first direction, is configured to have one or more front motors located at a front side and one or more rear motors located at a rear side;
   one or more front propellers mounted on the one or more front motors, respectively;
   one or more rear propellers mounted on the one or more rear motors, respectively; and
   a mounting part on which a load is mountable, the mounting part being provided below the arm part,
   wherein a diameter of the one or more front propellers is smaller than a diameter of the one or more rear propellers,
   wherein one or more intermediate propellers are disposed between the one or more front propellers and the one or more rear propellers, and
   wherein a diameter of each of the one or more intermediate propellers is greater than the diameter of each of the one or more front propellers, and smaller than the diameter of each of the one or more rear propellers.

2. The rotorcraft of claim 1, wherein the rotorcraft is provided with two of the one or more front propellers and two of the one or more rear propellers.

3. The rotorcraft of claim 1, wherein the arm part is configured to support the one or more front motors and the one or more rear motors to locate the one or more front propellers below the one or more rear propellers when the rotorcraft moves forward in the first direction.

* * * * *